H. OPP.
Gang-Plow.

No. 165,497.          Patented July 13, 1875.

WITNESSES:
Chas. Nida
A. F. Terry

INVENTOR:
Henry Opp
BY
[signature]
ATTORNEYS.

UNITED STATES PATENT OFFICE.

HENRY OPP, OF BELLEVILLE, ILLINOIS.

IMPROVEMENT IN GANG-PLOWS.

Specification forming part of Letters Patent No. 165,497, dated July 13, 1875; application filed May 1, 1875.

*To all whom it may concern:*

Figure 1:
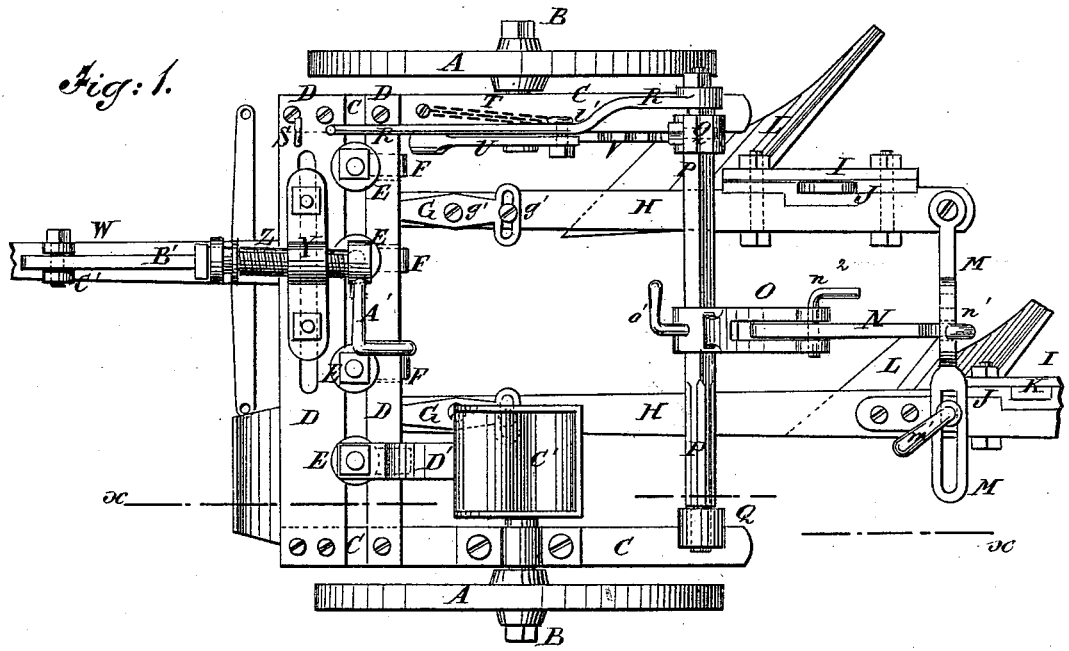
Figure 2:
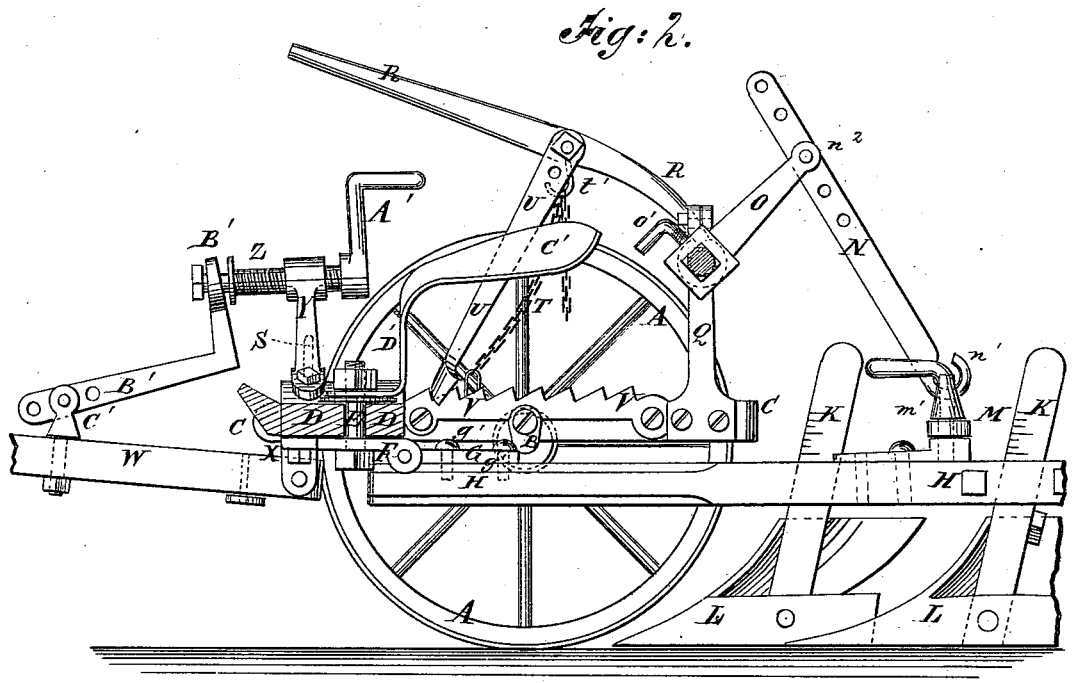

Be it known that I, HENRY OPP, of Belleville, in the county of St. Clair and State of Illinois, have invented a new and useful Improvement in Gang-Plow, of which the following is a specification:

Figure 1 is a top view of my improved gang-plow. Fig. 2 is a vertical longitudinal section of the same taken through the line $x\ x$, Fig. 1.

Similar letters of reference indicate corresponding parts.

The invention will first be described in connection with drawing, and then pointed out in the claim.

A are the wheels, which revolve upon the short axles B. The short axles B are attached to the side bars C of the frame, the axle of the land-side wheel being attached to the upper side of its bar C, and the axle of the furrow-wheel being attached to the lower side of its side bar C, so that the machine may run level when at work. The forward ends of the side bars C are connected by two parallel cross-bars, D, which are placed at such a distance apart as to leave between them a narrow space to receive the bolts E. Upon the bolts E, at the lower side of the bars D, are placed small plates F, having eyes formed in their rear ends to receive the rounded ends of the cross-heads formed upon the forward ends of the plates G. The plates G are secured to the upper side of the forward ends of the plow-beams H by two bolts, $g'$, the rear bolt passing through a short transverse slot in the widened rear ends of the said plates. By this construction, by loosening the nuts of the bolts E, the forward ends of the plow-beams H may be adjusted at any desired distance apart, and by loosening the rear bolt $g'$ the plow-beams H may be adjusted to take or leave land, as may be desired. The plow-beams H are made of different lengths, so that the forward plow may always be out of the way of the furrow-slice turned by the following plow. To the side of each of the plow-beams H are bolted two plates, I J. The outer plate I is made straight, and the inner plate J is made with an offset, which is let into the side of the beam H, and which is notched to receive the standards K of the plows L, said notches being made not quite so deep as the standards K are thick, so that the said standards may be firmly clamped by and between the said plates. Upon the sides of the standards K are formed scales of division-marks, so that the plows can be readily adjusted to work at exactly the same depth in the ground. The rear parts of the plow-beams H are connected by a cross-bar, M, one end of which is slotted longitudinally to receive the bolt $m'$, by which it is secured to the plow-beam, so that by loosening the bolt $m'$ the rear ends of the plow-beams may be adjusted to correspond with the adjustment of their forward ends. In the body of the cross-bar M are formed one or more holes to receive the hook $n^1$ formed upon the rear end of the bar N, the forward end of which passes through the slotted upper end of the standard O, and has a number of holes formed through it to receive the pin or bolt $n^2$, by which it is pivoted to said slotted standard O. The lower end of the standard O has a square hole formed through it to receive the square shaft P, to which it is secured adjustably by a set-screw, $o'$. The journals of the shaft P work in bearings in the upper ends of the standards Q, the lower ends of which are bolted to the rear ends of the side bars C. To the shaft P is secured the end of a lever, R, which extends forward into such a position that it may be reached and operated by the driver from his seat. By this construction, by operating the lever R, the plows may be raised from the ground and lowered to work at any desired depth in the ground. The forward end of the lever R, when lowered to raise the plows away from the ground, is secured by a hook, S, attached to the forward cross-bar D. The upward movement of the lever R, and consequently the depth to which the plows enter the ground, is limited by a chain, T, the lower end of which is secured to one of the side bars C, and which is hooked upon a hook, $t'$, attached to the lever R. To the lever R is pivoted a pawl, U, the engaging end of which rests upon a ratchet-bar, V, attached to the side bar C. The pawl U thus holds the plows to their work and prevents them from running out of the ground when plowing hard ground, while the chain T prevents them from entering the ground too deep when plowing loose ground. W is the tongue, the rear end of which is pivoted to the lugs of a plate, X, attached to the forward cross-bar D. To the front cross-bar D, directly above the rear end of the tongue W, is secured the base of the standard Y. The lugged plate X and the standard Y are secured by the same bolts, which pass through a slot in the bar D, so that the tongue W and the standard Y can be moved to adjust the line of draft, as may be desired. In the upper end of the standard Y is formed a screw-hole, through which passes a screw, Z. To the rear end of the screw Z is attached a crank, A′, and its forward end is swiveled to the short arm of a right-angled bar, B′. The long arm of the bar B′ passes through a slot in the upper end of a stud, C′, and is secured in place by a pin or bolt. Several holes are formed in the long arm of the bar B′ to receive the said pin or bolt, so that the said bar can be adjusted, as required. The stud B′ is secured to the tongue W, so that by turning the crank-screw Z A′ the plow-points can be raised or lowered without stopping the machine, as the surface of the ground may require. C′ is the driver's seat, the spring-standard D′ of which is secured to the frame C D by one of the bolts E that hold the eye-plates F. One, two, or three plows may be used in connection with the frame-work, as may be desired.

Having thus described my invention, I claim as new and desire to secure by Letters Patent—

1. The combination of the bolts E, the eye-plates F, and the bars G, having cross-heads upon their forward ends and short transverse slots in their widened rear ends, with the cross-bars D of the frame C D, and with the plow-beams H, substantially as herein shown and described.

2. The combination of the chain T, the pawl U, and the ratchet-bar V, with the complex lever M N O P Q R, and the frame C D, substantially as herein shown and described.

3. The combination of the lugged plate X, the standard Y, the crank-screw Z A′, the bent bar B′, and the stud C′, with the frame C D, and the tongue W, substantially as herein shown and described.

HENRY OPP.

Witnesses:
B. J. WEST, Jr.,
PH. SCHUCK.